C. A. MEDBERY.
LOCK WASHER.
APPLICATION FILED JUNE 23, 1919.
1,342,559.
Patented June 8, 1920.
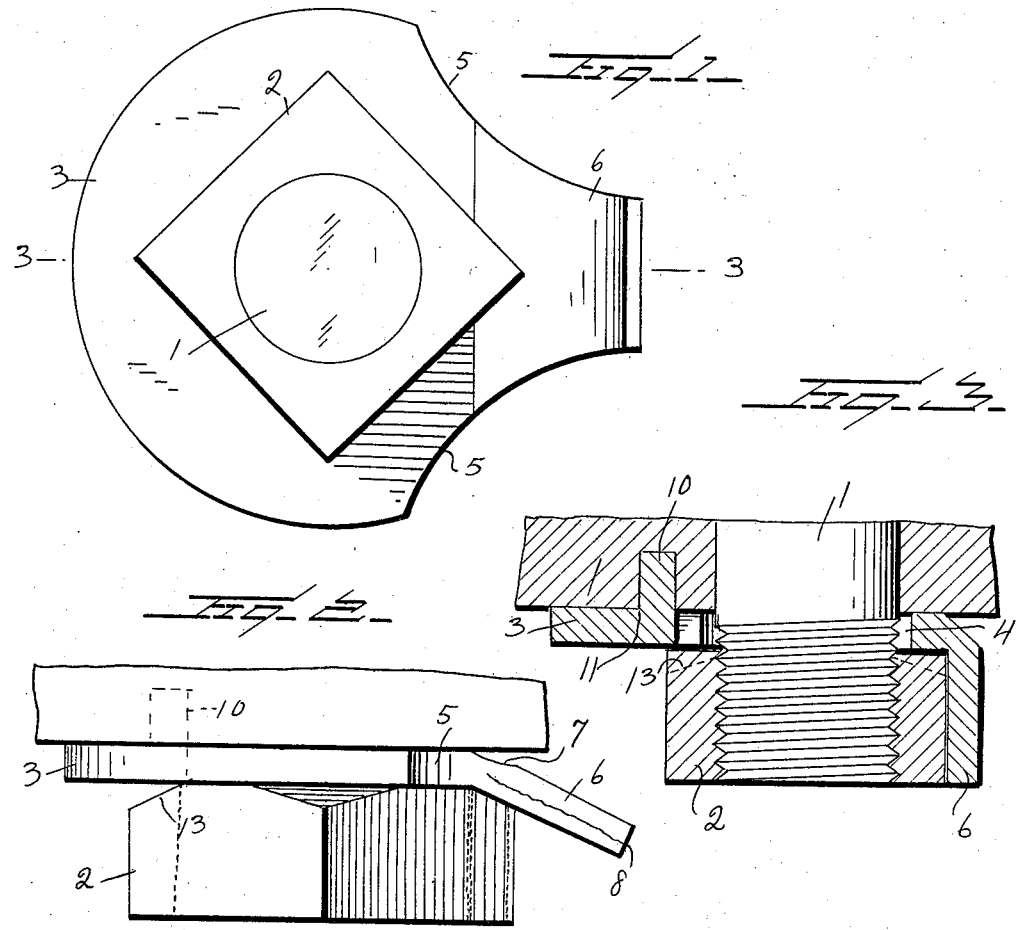
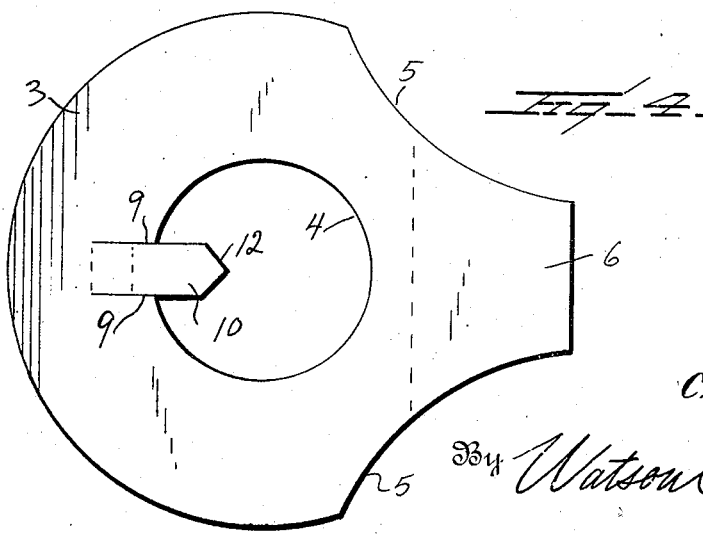
Inventor
C. A. Medbery
By Watson E. Coleman
Attorney

UNITED STATES PATENT OFFICE.

CLINTON A. MEDBERY, OF SAN ANTONIO, TEXAS.

LOCK-WASHER.

1,342,559.   Specification of Letters Patent.   Patented June 8, 1920.

Application filed June 23, 1919. Serial No. 306,063.

*To all whom it may concern:*

Be it known that I, CLINTON A. MEDBERY, a citizen of the United States, residing at San Antonio, in the county of Bexar and State of Texas, have invented certain new and useful Improvements in Lock-Washers, of which the following is a specification, reference being had to the accompanying drawings.

This invention relates to an improved lock washer especially adapted for locking nuts, and one of the objects of the invention is to provide a simple, efficient and practical device of this kind to be interposed between the nut and a member to be clamped by the nut, and having means engaging into the member to be clamped, and additional means to be bent up in engagement with one face of the nut, thereby preventing displacement of the nut.

A further object of the invention is the provision of a lock washer to be stamped from a single piece of sheet metal, said washer having an opening for the reception of the shank of the bolt, and a tongue to be stamped from the metal at the same time with the formation of the lock washer and the construction of the opening through the washer, said tongue extending normally radially with the center of the opening, but when the lock washer is applied as heretofore mentioned, the tongue is disposed at right angles to the washer to extend into the member to be clamped. It is obvious that by the provision of the tongue, accidental rotation of the washer is prevented.

The invention further aims to provide an extension on the lock washer constructed at the same time with the formation of the washer and the same being bendable to a position in contact with one face of the nut thereby preventing accidental rotation of the same. It is obvious that the lock washer is held in position by the tongue, and the bendable part of the lock washer is in contact with one face of the nut, preventing the same from accidental rotation. In order to facilitate the bending of the extension, the under portion of the lock washer is provided with an indenture or cut-away portion at the point where the extension is designed to be bent. Obviously this indenture will permit the extension to be easily bent in contact with one face of the nut.

The present design of this invention is deemed preferable. However, it is obvious that in reducing the device to a practicable form for commercial purposes, alterations in the minor details of construction may be found necessary. The right to these alterations is claimed, provided the alterations fall within the scope of what is claimed.

The invention comprises further features and combination of parts, hereinafter set forth, shown in the drawings and claimed.

In the drawings:

Figure 1 is an end view of a bolt showing a conventional form of nut applied thereto, and illustrating the lock washer interposed between the nut and a member to be clamped.

Fig. 2 is a side elevation of Fig. 1.

Fig. 3 is a sectional view on line 3—3 of Fig. 1; and showing the nut turned home, whereby the tongue 6 may engage one of the flat sides of the nut.

Fig. 4 is a plan view of the lock washer showing the construction of the same before the tongue and the extension are bent, in fact, merely showing the blank.

Referring to the drawings, 1 designates a conventional form of bolt, 2 a nut which is threaded to the shank of the bolt, and 3 the lock washer. This lock washer is designed to be constructed from sheet metal by means of a single stamping and may be of any suitable shape or configuration, preferably such as that shown in the drawing. In constructing the lock washer, a central concentric opening 4 is provided, through which the shank of the bolt 1 extends. It will be noted that the opening 4 is of a slightly larger diameter than the diameter of the bolt shank, in order to permit of an easy insertion of the shank through the opening, in other words, to permit of an easy application of the lock washer to the shank.

In constructing the lock washer by means of a single stamping, either by means of a die or by virtue of a drop forge method, the lock washer is provided with a pair of diagonally opposite cut-away curved portions 5, the formation of which cause to be formed an extension 6, which slightly tapers. Also at the time of the formation of the washer, the extension is provided with an indenture 7 at the point where the extension is designed to be bent at an obtuse angle to the body of the lock washer, and also at the same time the extension is given a partial bend, as indicated in full lines in the side elevation, as shown at 8. Also in the side elevation of Fig. 2, the extension 6 is shown completely bent in dotted lines in order to engage one face of the nut.

As previously stated, the indenture or cut-away portion 7 acts to facilitate the complete bending of the extension 6. Also at the time of the formation of the washer, the body thereof is formed with slits 9, which are spaced and are adjacent the marginal edge of the opening 4. By the formation of the slits a tongue 10 is caused to be formed in the body of the washer. At a certain time during the formation of the washer this tongue 10 extends normally radially from the center of the opening, but when the lock washer is completely formed, this tongue is bent as at 11 so that the tongue may extend at right angles to the body of the washer. It is obvious that when the washer is applied to the shank of the bolt, and the nut is screwed home on the shank, the pressure of the nut in a direction toward the member to be clamped will cause the tongue (which is V-shaped and sharpened as shown at 12) to pierce into the member to be clamped. The tongue will then prevent accidental rotation of the lock washer.

The partial bend of the extension 6 is such that one face of the extension will conform to and engage in one of the bevels 13 of the nut 2. This disposition of the extension will not prevent the nut from freely rotating on the shank of the bolt, that is, while the nut is in the act of screwing home. However, after the nut reaches home, it is apparent that sufficient pressure may be applied to the extension 6, causing the same to bend and its outer face will then conform to one of the flat faces of the nut and since the tongue 10 is in engagement with the member to be clamped, the nut as well as the lock washer are prevented from accidental rotation.

The invention having been set forth, what is claimed as new and useful is:—

As a new article of manufacture, a lock washer constructed from a single piece of sheet metal comprising a body having a central opening through which a bolt is adapted to pass, whereby the body may be interposed between a nut and an element to be clamped, said body at a point adjacent the marginal edge of the opening being provided with a tongue extending radially of the opening and approximating the center thereof, said tongue having parallel opposite edges and terminating in a V-shaped extremity, the body adjacent to and alined with the opposite parallel edges of the tongue having parallel slits in planes offset on each side of the center of the opening, whereby the tongue may be bent upon itself at right angles to the body at a point outwardly offset from the edge of the opening, so as to prevent contact with the surface of a bolt when engaged through the opening, said body at points diagonally opposite the end of the tongue having enlarged cut away portions, said body also at a point diametrically opposite the end of the tongue having an additional broad tongue caused to be formed by said cut away portion, one face of said broad tongue at a point approximating the edge of the opening having a transversely extending groove of a gradual curved depth in cross section, the broad tongue lying normally at an obtuse angle to the body to permit a tool to be inserted between said tongue and the element to be clamped, whereby the broad tongue may be given a bend to contact with one of the flat faces of a nut, the normal obtuse angle of the broad tongue corresponding to the corner bevels of a nut, whereby the nut may be turned to its limit on a bolt.

In testimony whereof I hereunto affix my signature in the presence of two witnesses.

CLINTON A. MEDBERY.

Witnesses:
Jos. A. Dodge,
Z. M. Burgee.